J. W. CAHILL.
BALANCE WHEEL AND STAFF FASTENER.
APPLICATION FILED APR. 24, 1909.
949,645.
Patented Feb. 15, 1910.
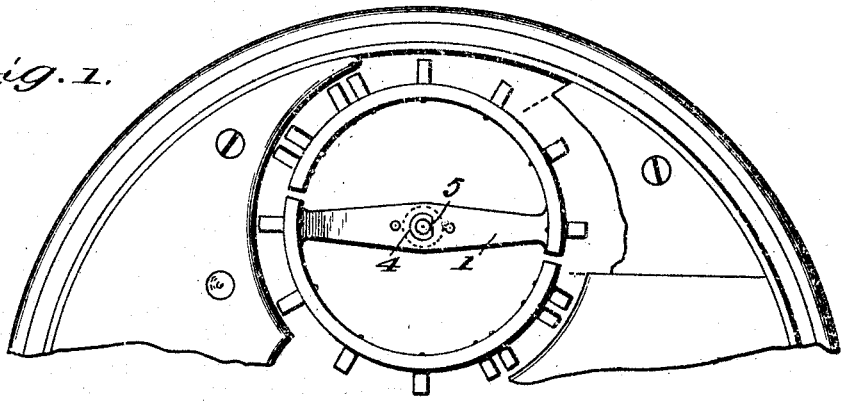
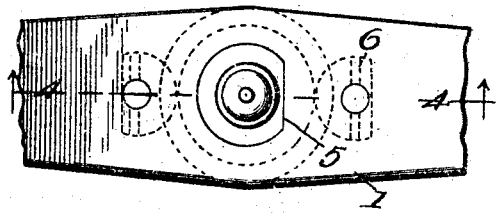
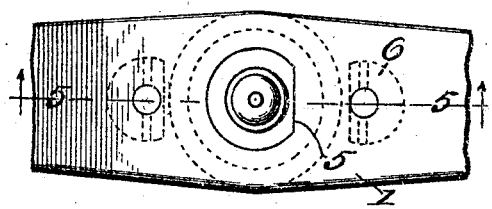
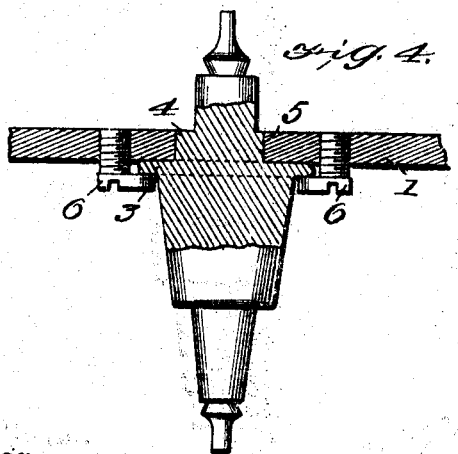
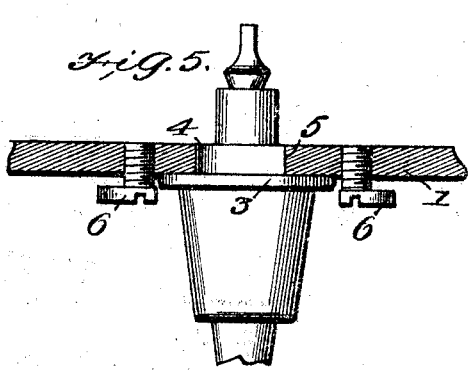
Witnesses
F. C. Barry
U. B. Hillyard
Inventor
Jacob W. Cahill
By Victor J. Evans
Attorney

UNITED STATES PATENT OFFICE.

JACOB W. CAHILL, OF ST. JOHN, NEW BRUNSWICK, CANADA.

BALANCE-WHEEL AND STAFF-FASTENER.

949,645.  Specification of Letters Patent.  Patented Feb. 15, 1910.

Application filed April 24, 1909. Serial No. 491,951.

*To all whom it may concern:*

Be it known that I, JACOB W. CAHILL, a subject of the King of Great Britain, residing at St. John, in the Province of New Brunswick and Dominion of Canada, watchmaker, have invented new and useful Improvements in Balance-Wheels and Staff-Fasteners, of which the following is a specification.

In watch movements, it is the common practice to secure the staff to the balance wheel by riveting, hence, when making repairs it is necessary to cut the rivet and to drive the staff from the balance wheel. This operation is tedious and often times results in bending the staff and causing the balance wheel to get out of true.

The purpose of the present invention is to devise means for securing the balance staff in position which will admit of the ready removal of the staff without requiring riveting or the driving of the staff either into or out of position.

A further purpose of the invention is to combine with the staff, a balance, means for securing the staff, the same comprising fasteners fitted to the balance and adapted to interlock with the staff, said fasteners in the preferable construction consisting of screws mounted in threaded openings in the balance and adapted in one position to engage with a part of the staff so as to positively secure the same and in another position to release said staff and admit of its ready removal from the balance.

The invention consists of the novel feature, details of construction and combinations of parts which hereinafter will be more particularly set forth, illustrated and finally claimed.

Referring to the drawings forming a part of the specification, Figure 1 is a plan view of a portion of a watch movement provided with a balance wheel and staff embodying the invention. Fig. 2 is a detail view of a part of the balance and an end view of the staff showing the fastening means in locked engagement. Fig. 3 is a view similar to Fig. 2 showing the fastening means turned, so as to release the staff. Fig. 4 is a sectional view on the line 4—4 of Fig. 2. Fig. 5 is a sectional view on the line 5—5 of Fig. 3.

Corresponding and like parts are referred to in the following description and indicated in all the views of the drawings by the same reference characters.

The balance wheel may be of any make or construction and comprises a rim and a cross bar 1. The balance staff may be of usual construction and comprises a hub 2 and the usual pivots. An outer flange 3 is provided at one end of the hub 2 and an enlarged portion 4 is provided adjacent the flange 3 and is adapted to enter an opening formed in the cross bar 1. To prevent turning of the balance staff within the opening of the balance or cross bar 1 the enlarged portion 4 has a flattened side 5 and the opening in said cross bar is likewise formed with a straight portion to receive the flattened side 5 of the part 4. It is to be understood that the opening formed in the balance is of a size to snugly receive the enlarged portion 4 of the balance staff so as to prevent any possible movement when the parts are assembled. The flange 3 overlaps and engages with a portion of the balance or cross bar 1 adjacent the opening into which the enlarged portion 4 of the staff is fitted.

Fasteners 6 are fitted to the balance or cross bar 1 and are adapted to interlock with the flange 3 so as to secure the balance staff and hold the same when placed in position. The form of fasteners 6 preferred consist of screws which are threaded into openings formed in the balance or cross bar 1 upon opposite sides of the balance staff. The screws 6 are headed and a portion of the head of each is cut away so that in one position of the screws as indicated in Figs. 3 and 5 the balance staff is free to be removed from the balance and in another position of the screws the heads thereof engage the flange 3 as indicated most clearly in Figs. 2 and 4 thereby securing the balance staff to the balance or cross bar 1.

It will be observed on reference to Figs. 4 and 5 that the balance staff obtains an extended bearing upon the balance represented by the part of the enlarged portion 4 and the flange 3 in contact with the balance. It is also observed that when turning the screws 6, the heads thereof are at the same time advanced thereby clamping the flange 3 of the staff against the balance or cross bar 1. When it is required to remove the balance staff for any purpose it is necessary only to turn the screws 6 to disengage the heads thereof from the flange 3 when the staff may be removed in the manner well understood.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claim hereto appended.

Having thus described the invention, what is claimed is—

In combination, a balance having an opening formed with a straight side, a staff comprising a body and reduced ends terminating in pivots, the body having a flat sided portion to snugly fit within the opening of the balance, and having an outer flange to overlap the portion of the balance provided with said opening, and fastenings threaded into the balance and having laterally extending portions which in one position engage the flange of the staff, and which in another position clear the flange, whereby the staff may be removed or readily placed in position.

In testimony whereof I affix my signature in presence of two witnesses.

JACOB W. CAHILL.

Witnesses:
SOLOMON McCONNELL,
JAMES HOWARD.